(12) United States Patent
Hinderling et al.

(10) Patent No.: US 6,411,371 B1
(45) Date of Patent: Jun. 25, 2002

(54) DEVICE FOR OPTICAL DISTANCE MEASUREMENT

(75) Inventors: Jurg Hinderling, Marbach; Paul Benz, Diepoldsau, both of (CH)

(73) Assignee: Leica Geosystems AG, Heerbrugg (CH)

(*) Notice: Subject to any disclaimer, the term of this patent is extended or adjusted under 35 U.S.C. 154(b) by 0 days.

(21) Appl. No.: 09/386,366

(22) Filed: Aug. 31, 1999

(30) Foreign Application Priority Data

Sep. 2, 1998 (DE) .......................... 198 40 049

(51) Int. Cl.[7] .................................. G01C 3/08

(52) U.S. Cl. .................. 356/4.01; 356/5.01; 356/5.1

(58) Field of Search ................ 356/4.01, 5.01, 356/5.1

(56) References Cited

U.S. PATENT DOCUMENTS 5,291,263 A * 3/1994 Kong
5,589,883 A 12/1996 Ogino et al.

FOREIGN PATENT DOCUMENTS

| CH | 522 203 | 1/1971 |
| DE | P 19 28 095 | 12/1969 |
| DE | 27 50 933 A1 | 5/1978 |
| DE | 35 18 036 A1 | 11/1985 |
| DE | 35 45 827 A1 | 8/1986 |
| DE | 40 02 356 C1 | 2/1991 |
| DE | 693 09 631 T2 | 6/1994 |
| DE | 43 16 348 A1 | 11/1994 |
| DE | 196 15 601 A1 | 1/1997 |
| DE | 197 27 988 A1 | 1/1998 |
| EP | 0 246 354 A2 | 11/1987 |

(List continued on next page.)

OTHER PUBLICATIONS

W. Huep et al., *Theodolite systems for industrial and geodetic measurements*, Technische Rundschau No. 39, 1988, pp. 14–18.
*Optischer Distanzsensor auf Basis der Lichtlaufzeitmessung*, Industrie, 11/1992, pp. 6–8.
Operating Manual "Geodimeter® 710", AGA Geotronics AB, Lindigo, Sweden 1974.
"Geodimeter 700" Brochure, AGA Geotronics AB, Lindigo, Sweden 1974.
"Geodimeter 710" Brochure, AGA Geotronics AB, Lindigo, Sweden 1974.
R Johanson: Electronic distance measuring; reprint from Australian Electronics Engineering, Apr. 1972.
Prof. Dr.–Ing Fritz Deumlich, "Instrumentenkunde der Vermessungstechnik", Berlin, 1972, p. 281.
"Physik–Gleichungen und Tabellen", 1969, p. 286.
Joeckel and Stober, "Elektronische Entfernungs—und Richtungsmessung", Stuttgart, 9195, pp. 190 and 191.

(List continued on next page.)

*Primary Examiner*—Stephen C. Buczinski
(74) *Attorney, Agent, or Firm*—Oliff & Berridge, PLC (57) ABSTRACT

The invention relates to a device for optical distance measurement in geodetic and industrial surveying. It comprises a transmitter unit (1) having one or two optical radiation sources (2, 3) which emit a diffraction-limited, visible radiation and a divergent visible or infrared radiation. The radiation of the two radiation sources (2, 3) is passed through a common lens (5) and directed toward a target object (6). The radiation reflected or scattered by the target object (6) is received by the same lens (5). Selection means (10; 10a, 10b, 10c; 11; 12a, 12b) for selecting the radiation or the radiation sources (2, 3) are provided. Consequently, the distance to cooperative and noncooperative target objects (6) can be measured at short and long distances with high positional resolution. When used in a theodolite, the three-dimensional coordinates of the target object (6) can be determined with very high accuracy.

29 Claims, 9 Drawing Sheets

FOREIGN PATENT DOCUMENTS

| | | |
|---|---|---|
| EP | 0 313 518 B1 | 4/1989 |
| EP | 0 635 729 A1 | 1/1995 |
| EP | 0 661 519 A1 | 7/1995 |
| EP | 0 428 027 B1 | 8/1995 |
| JP | 7012934 A | 1/1995 |
| WO | WO 99/12052 | 3/1999 |

OTHER PUBLICATIONS

R Johanson: "Electronic Distance Measuring"; reprint from Australian Electronics Engineering, Apr. 1972.

Grimm et al., "Distomat Wild DI3000, Timed–Pulse Distance Measurement with Geodetic Accuracy", Heerbrugg, pp. 2–14.

* cited by examiner

DEVICE FOR OPTICAL DISTANCE MEASUREMENT

The invention relates to a device for optical distance measurement in geodetic and industrial surveying, according to the features in the preamble of claim 1.

Optical distance measuring devices have wide-ranging applications in geodetic and industrial surveying. Together with an angle measurement, they help to determine the three-dimensional coordinates of target points or target objects in space. The target points to be surveyed are marked by means of reflection-supporting aids. Other target points or target objects are directly sighted as such. From the point of view of measurement, a distinction is made between cooperative and noncooperative target objects. Cooperative target objects are self-luminescent or reflecting target marks, such as spherical reflectors, reflecting foils or triple prisms. Noncooperative target objects are natural, rough surfaces, such as, for example, those of buildings or rocks.

The target objects are sighted by means of a theodolite, which contains a distance-measuring device mounted on the theodolite telescope, or by means of a tacheometer, i.e. a theodolite having an integrated distance-measuring device. The distance measurement is carried out by the phase or transit time measuring principle with intensity-modulated or pulsed radiation. The three-dimensional coordinates of the target objects are determined relative to a specified coordinate system by the angle and distance measurement. Consequently, the coordinates of individual target points can be determined in geodetics, in building surveying or in industrial surveying. Alternatively, surfaces, for example of aircraft, provided with cooperative target marks can be surveyed (W. Huep, O. Katowski: Theodolitsysteme für Industrielle und geodätische Messungen [Theodolite systems for industrial and geodetic measurements], in: Technische Rundschau No. 39, 1988, pages 14–18).

On the other hand, it is also possible to pinpoint the coordinates specified on a map or on a building plan by means of a tacheometer and a surveyor's staff equipped with reflectors. This is usual in the building industry or for locating in road construction. Tacheometers are also used for controlling advancing machines in road construction, tunnel construction and mining.

Conventional electronic theodolites measuring to target marks utilize distance-measuring devices which are integrated or mounted on the theodolite telescope. Virtually all integrated or mounted distance-measuring devices have a biaxial optical system for transmitted and received beams. Furthermore, EP 0 313 518 B1 discloses a distance-measuring device in a coaxial optical embodiment which has an He-Ne laser as a light source and can measure to reflection foils and to natural objects. However, this is a mounted distance-measuring device which as such has a parallax with respect to the theodolite sighting axis and in which the location of the measuring spot and the location sighted via the theodolite are not identical.

The biaxial integrated or mounted distance-measuring devices have a separate, in general laterally offset transmitted and received beam path. This takes into account the lateral offset of the light beam on reflection by retroreflecting target marks (e.g. triple prisms) which reflect an incident light beam parallel and with lateral displacement. In the case of the integrated distance-measuring device, one half of the theodolite telescope lens is used for the transmitted beam and the other half of the telescope lens for receiving the reflected beam. On the other hand, a mounted distance-measuring device has both a completely separate optical axis for the transmitting and receiving optical system and a parallax with respect to the sighting axis of the theodolite telescope. This means that the target point to which the sighting axis of the theodolite telescope is pointed and the location of the measuring spot of the mounted distance-measuring device on the target object are not identical. This is disadvantageous for point measurements. Because of this inter alia, mounted distance-measuring devices are gradually being replaced by integrated distance-measuring devices.

Biaxial distance-measuring devices capable of measuring the distance both to reflector targets and to noncooperative target objects having a naturally rough surface are furthermore known. For example, such devices are used for surveying poorly accessible surfaces, such as in plant construction (cooling towers of nuclear power stations), in bridges, dams, in quarries or in shipbuilding. Further applications are in the profile measurement of tunnels, shafts and roads and in the surveying of building facades. The range is a few hundred meters in the measurement to such noncooperative targets. The biaxiality of these distance-measuring devices gives rise to a parallax which results in an offset of the center of gravity of the image spot. This effect is so pronounced, particularly at close range, that a measurement is not possible without additional technical measures. For example, ancillary lenses are therefore mounted on the transmitting and receiving optical system in the measurement of short distances, as is the case with the distance-measuring device WILD DIOR 3002S from Leica. This implies a certain handling effort. In another technical solution, the parallax is compensated by rotating a rhomboid prism, mounted on ball bearings, as a function of the displacement of the focal lens of the theodolite telescope (biaxial tacheometer Rec Elta RL from Zeiss with two lenses for the transmitting and receiving optical system). With the precisely moved optical and mechanical components, such a compensation of the parallax means a high degree of technical complexity and moreover leads to a large and heavy surveying instrument.

The biaxial distance-measuring devices mentioned so far operate with radiation sources which emit infrared light with large beam spread angles. The light beam diameters are as much as 15–20 cm at a distance of 100 meters. In the case of distance measurements to reflectors, it is true on the one hand that large light beam diameters are advantageous for locating the reflectors. On the other hand, a large light beam diameter for measuring to noncooperative targets leads to greatly reduced local resolution since . the distance value intensity-weighted according to the local reflection properties is measured over the irradiated area. In the case of inclined or structured object surfaces, this does not result in a true distance to the target point of the distance-measuring device. Thus, for example, protuberances present on the object surface and having a small diameter, pipes and cables on facades or in inner rooms of buildings or the structures of window reveals are not measurable owing to the large cross-sectional area of the light beam. Even in the case of short distances of a few meters, the light beam diameter is already several centimeters. Consequently, even steps in surfaces are easily covered by the large measuring spot, resulting in an erroneous distance measurement.

In the case of inclined surfaces on which the measuring light beam is not perpendicularly incident, inhomogeneities of the object surface within the measuring spot can give rise to locally different degrees of reflection. Such inhomogeneities are formed, for example, by soiling, by different surface coatings, moisture or roughness of surfaces. The locally different reflections within the measuring spot result in an unequal weighting in the distance measurement, so that it is not the actual distance to the point of intersection of the sighting axis of the surface to be surveyed that is measured.

Finally, with the use of infrared radiation for the measurement, the actually measured object point on a surface is not detectable. The object point is sighted only indirectly either by means of the telescope optical system of the tacheometer or by the use of the visible radiation of a laser pointer aligned with the sighting axis of the distance-measuring device.

Hand-held distance-measuring devices which operate with a visible measuring beam for noncooperative targets at short distances are furthermore known. DE 40 02 356 C1 describes a distance-measuring device having separate transmitting and receiving beam paths for the distance range of 2–10 m. It contains two laser diodes which are switchable in an electronically complementary manner, one of which sends its light wave train along the measuring distance to the target and the other sends its light wave train along a reference distance inside the device for calibration purposes. The two light wave trains are received alternately by the same photodetector. The journal "Industrie", 11/92, page 6–8, describes a distance-measuring device DME 2000 from Sick GmbH, which operates with two semiconductor laser diodes. The required transmitted light is generated by a laser diode with an optical collimator system, and the second laser diode delivers the necessary reference signal directly to the receiver. The transmitted and received beams are coaxial with one another. The measured distance to natural surfaces is limited to 4 meters. DE 43 16 348 A1 discloses a, device for distance measurement which has a separate transmitted beam path and received beam path and by means of which it is possible to measure to naturally rough surfaces up to a distance of 30 meters using visible radiation.

It is the object of the invention to provide a device for distance measurement for geodetic or industrial surveying purposes or for the surveying purposes in the building industry, by means of which device it is possible to measure both to cooperative and to noncooperative target objects, which device has a high local resolution also in the case of noncooperative target objects so that the distance to small structures on naturally reflecting surfaces can be measured, by means of which device large and small distances can be measured with geodetic accuracy and by means of which device all types of target objects in any distance range can be visually sighted easily and without effort.

This object is achieved, according to the invention, by the features stated in the defining clause of claim 1. Advantageous embodiments and further developments of the invention are evident from the subclaims.

In the distance-measuring device according to the invention, one or two optical radiation sources which generate two radiation beams are integrated in the transmitter unit. The radiation beams differ in their beam divergence, the radiation of one radiation beam being in the visible wavelength range and being diffraction-limited. The other radiation beam diverges. A common lens is used, both for the radiation directed at the target object and for receiving the radiation reflected or scattered by the target object. In addition, selection means for distinguishing between the two types of radiation or radiation beams are used. In general, this results in a number of advantages in surveying in geodetics, in the building industry and in industrial surveying. The advantages are the adaptation to different types of target objects, the very high accuracy of measurement and reliability of measurement for the total distance measuring range to be covered and easy and fast handling and measuring sequences.

The radiation types used in the distance-measuring device and the associated divergences of the radiation beams are optimally adapted for various types of target objects and distances. In the case of measurement tasks where mm or sub-mm accuracy of measurement is required, the target points are marked with reflectors or reflecting foils. Radiation having a large beam divergence is suitable for this purpose since, where a transit time measuring method is used, inhomogeneities having the same transit time are smoothed by large beam divergences.

Furthermore, large distances are measured with the aid of reflectors. Here too, the large beam divergence is advantageous since, owing to the large beam cross-section at the reflector location, the reflector is easily detected. Infrared radiation is preferably used, so that operators (persons holding the surveyor's staff) or passers by are not dazzled. This applies in particular in the case of measurements to mobile cooperative targets in the near distance range, where the luminous intensity of the measuring light beam is high.

The approximate sighting of the target object is effected by visual estimation or by simple aids, such as backsight and frontsight, or a diopter mounted on the distance-measuring device. When the distance-measuring device is installed in a theodolite, the theodolite telescope can of course be used for sighting in the case of very large distances.

For the measurement to target objects having naturally rough surfaces, the diffraction-limited visible radiation is used. The diffraction-limited radiation beam has the smallest possible beam divergence and hence a very small beam diameter. Thus, a measuring spot having only a small diameter is produced on the target object. Consequently, even small structures on a surface can be surveyed. It is this that makes it possible at all to survey, for example, thin pipes and electrical cables on facade surfaces or inner rooms or the three-dimensional structure of surfaces themselves. In addition, the measuring spot of the measuring radiation is visible on the target object. The structures are thus sighted with the measuring radiation itself and the size of the measuring spot is detectable. This results in a greater advantage in terms of handling and speed. Moreover, this also results in a high degree of reliability of measurement. The true distance values are determined since sighting beam and measuring beam are identical. The separately arranged laser pointer as a sighting aid or an otherwise necessary view through a telescope optical system for sighting is dispensed with.

Furthermore, when a laser is used as a diffraction-limited radiation source in the visible wavelength range, the laser safety regulations permit higher transmission powers. This circumstance favors the range to noncooperative target objects which, in comparison with the cooperative target objects, have a degree of reflection which is lower by several orders of magnitude.

In addition to the use of diffraction-limited visible radiation for noncooperative target objects in the range of relatively short distances, said radiation can in specific cases also be used for cooperative target points at particularly long distances of many km, owing to the higher radiant power. However, with the small beam diameter, it is difficult to strike the reflector target.

The divergent radiation beam is used for the routine measuring range up to a few km to reflector targets. However, this can also be used for noncooperative target objects where it is not matter of surveying very small structures.

To adapt the measurement to a very wide range of target objects and distances, selection means are provided for the different types of radiation, and radiation beams. The selection means may be various optical filters and/or switching devices. For example, switching between the radiation beams can be effected by the user at the press of a button, so that the user can consciously decide in favor of a specific radiation beam for his measuring problem. However, the switching can also be effected automatically by the distance-measuring device itself, for example as a function of the measurement of the received light intensities or of the measured distance. It is of course also possible, independently of measuring criteria, to switch back and forth constantly between the radiation beams with a certain clock frequency. However, simultaneous and continuous radiation emission of the two radiation beams and corresponding continuous illumination of the target object are also possible, the selection according to the radiation beams being effected only in the received beam path.

The selection of the radiation can therefore be realized in various ways with the aid of different selection means. In the case of the simultaneous emission of the two radiation beams, filters can be mounted as selection means in front of the detector in the received beam path. The filters allow through only one or only the other radiation. For example, a manually operable or motor-driven filter wheel comprising corresponding filters can be used for this purpose. The respective radiation beam is received by a single detector. Alternatively, the received beam path can be divided with the aid of a selective beam divider into two beam paths for one radiation beam each, so that two detectors can simultaneously measure the respective received radiation.

On the other hand, the selection of the radiation beams can be effected in the transmitter unit itself. Thus, electrooptical devices, mechanical devices, filters or a controllable frequency doubler or Q-switcher can be introduced into the beam paths, directly before one radiation source or before both radiation sources and each alternately block or suppress one radiation beam and release the other as measuring radiation. It is of course also possible to switch each of the radiation sources themselves on and off so that only one radiation beam is ever emitted. In these cases, filters are not in principle required in the received beam path. Additional filters are of course useful, however, for eliminating stray light and for achieving a high signal/noise ratio.

The radiation beams are passed alternatively or simultaneously through the lens in the direction of the target object. In principle, all parts of the lens are suitable for this passage. It is therefore also possible to use a plurality of different parts of the lens aperture for the emitted radiation. The reflected radiation can in turn be received by another part of the lens.

Preferably, both radiation beams are passed with the center of gravity of the beam in the center of the lens, i.e. coaxial with the optical axis of the lens. This has the advantage that the receiver axis and simultaneously the optical axis of the lens, often serving as sighting axis, together with the two transmitter axes of the emitted radiation beams, is directed at the target object. The target object is sighted exactly at the same point at which the distance too is measured. Consequently, a very accurate distance measurement is achieved. The coaxiality of the emitted radiation does not necessarily mean that the beam cross-section must be rotationally symmetrical with the axis of the lens. A beam cross-section shaped asymmetrically with respect to the optical axis is also possible. The center of gravity of the area of the beam cross-section should preferably coincide with the optical axis of the lens The same lens is moreover designed for receiving the reflected radiation. Consequently, the distance-measuring device is at the same time also parallax-free, and it is therefore not necessary to take any additional measures for an otherwise necessary compensation of the parallax. Of course, the lens and associated further optical elements must have corresponding qualities with respect to the transmission of the radiations.

If the distance-measuring device is installed in a theodolite, the angle coordinates of the target object can also be determined in addition to the distance. The theodolite measures the horizontal and vertical angle of the optical axis of the theodolite telescope, directed at the target object, in a predetermined coordinate system. The distance-measuring device can in principle be installed as a separate measuring instrument in the theodolite or mounted on the theodolite telescope. However, additional advantages are obtained if distance-measuring device and theodolite are amalgamated to give one device having only a single lens. The lens then serves both for the distance-measuring device and theodolite telescope. As a result, only a single sighting axis exists. The distance measurement with transmitted and received beam path coaxial with this axis as well as the angle measurement relate to this sighting axis. A very high degree of accuracy in the determination of three-dimensional coordinates of the target object is thus achieved. The three-dimensional coordinates of various types of target objects in various distance ranges are thus measured with high resolution, quickly and reliably.

Embodiments of the invention are given in more detail below with reference to the drawing. In a schematic view.

Figure 1:
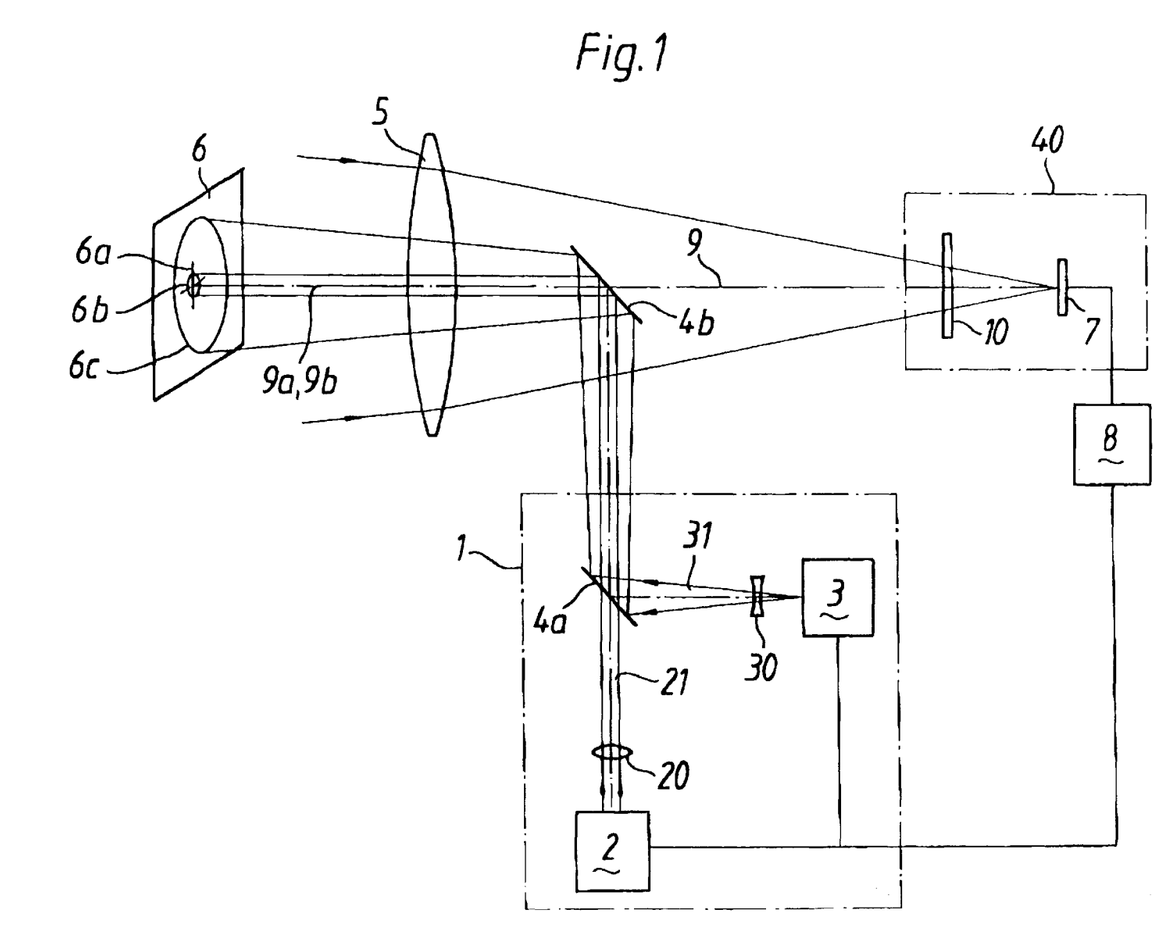
FIG. 1 shows a distance-measuring device according to the invention, having two radiation sources.

FIG. 1 schematically shows a distance-measuring device according to the invention. It comprises a transmitter unit 1 and two radiation sources 2, 3. One radiation source 2 emits diffraction-limited visible light in a radiation beam 21. A laser diode is preferably used as radiation source 2. Present-day commercial laser diodes emit a diffraction-limited radiation only in one plane, while a greater beam divergence is present in the plane perpendicular thereto. This is collimated by means of separate optical elements 20, for example by means of cylindrical lenses or an apodization filter. In more recent laser diodes, such optical elements 20 may already be integrated.

The other radiation source 3 emits a radiation beam 31 having a relatively large beam divergence. The beam divergence may have arisen on emission of the radiation or it can be produced by optical elements 30. The wavelength of the radiation is preferably in the infrared wavelength range. When visible light is used, a wavelength other than that of the first radiation beam 21 is used in this embodiment. Laser diodes or light emitting diodes may likewise be used as radiation-source 3. Compared with the light emitting diodes, laser diodes advantageously have a smaller transmission area and higher luminous power and are more economical, but they require more complicated actuation electronics.

The radiation beams 21, 31 of the two radiation sources 2, 3 are passed through a lens 5 with the aid of optical input elements 4a, 4b and directed at target object 6. Beam dividers or divider cubes can be used as optical input elements 4a, 4b. The input element 4a can moreover be a beam divider which is provided with optical layers and allows through the radiation of one radiation source 2 particularly well and at the same time reflects the radiation of the other radiation source 3 particularly well. The input element 4a may also be a mirror which has a hole and reflects the divergent radiation beam 31, while the diffraction-limited visible radiation beam 21 is passed through the hole. The input element 4b which follows in the beam path may also be in the form of a mirror for reflecting both radiation beams 21, 31.

The radiation emitted by the radiation sources 2, 3 can be passed through the lens 5 at various points in the direction of target object 6. FIG. 1 shows rays coaxial with the optical axis 9 of the lens 5, where the axes 9a, 9b of the radiation beams 21, 31 coincide with the optical axis 9.

The point of intersection of the optical axis 9 with the target object 6 is indicated by a cross 6a. The measuring spot 6b of the diffraction-limited radiation beam 21 and the measuring spot 6c of the divergent radiation beam 31 are concentric with the cross 6a in this embodiment.

The radiation reflected or scattered by the target object 6 is picked up by the lens 5. The lens 5 thus simultaneously serves as transmitting and receiving lens. The received radiation is focused by the lens 5 on an optoelectronic detector 7 in a detector unit 40. The detector signals are fed to a control and evaluation unit 8 in which the distance to the target object 6 is determined by the phase or transit time measuring principle. Accordingly, the emitted radiation is appropriately intensity-modulated or pulsed by a suitable mode of operation of the radiation sources 2, 3.

A selection means 10 for selecting the radiation of the radiation sources 2, 3 which is received by the lens 5 is provided before the detector 7, in the received beam path. The selection means 10 may be a manually or electrically operated device, such as, for example, a filter wheel or a filter slide, which introduce individual optical filters into the beam path. The individual filters allow through the radiation of only one radiation source 2 or of only the other radiation source 3. Such devices are known per se and are therefore not described in more detail. The detector 7 thus receives the radiation of the radiation sources 2, 3 selectively and in succession, the radiation of other wavelengths being blocked.

Figure 2:
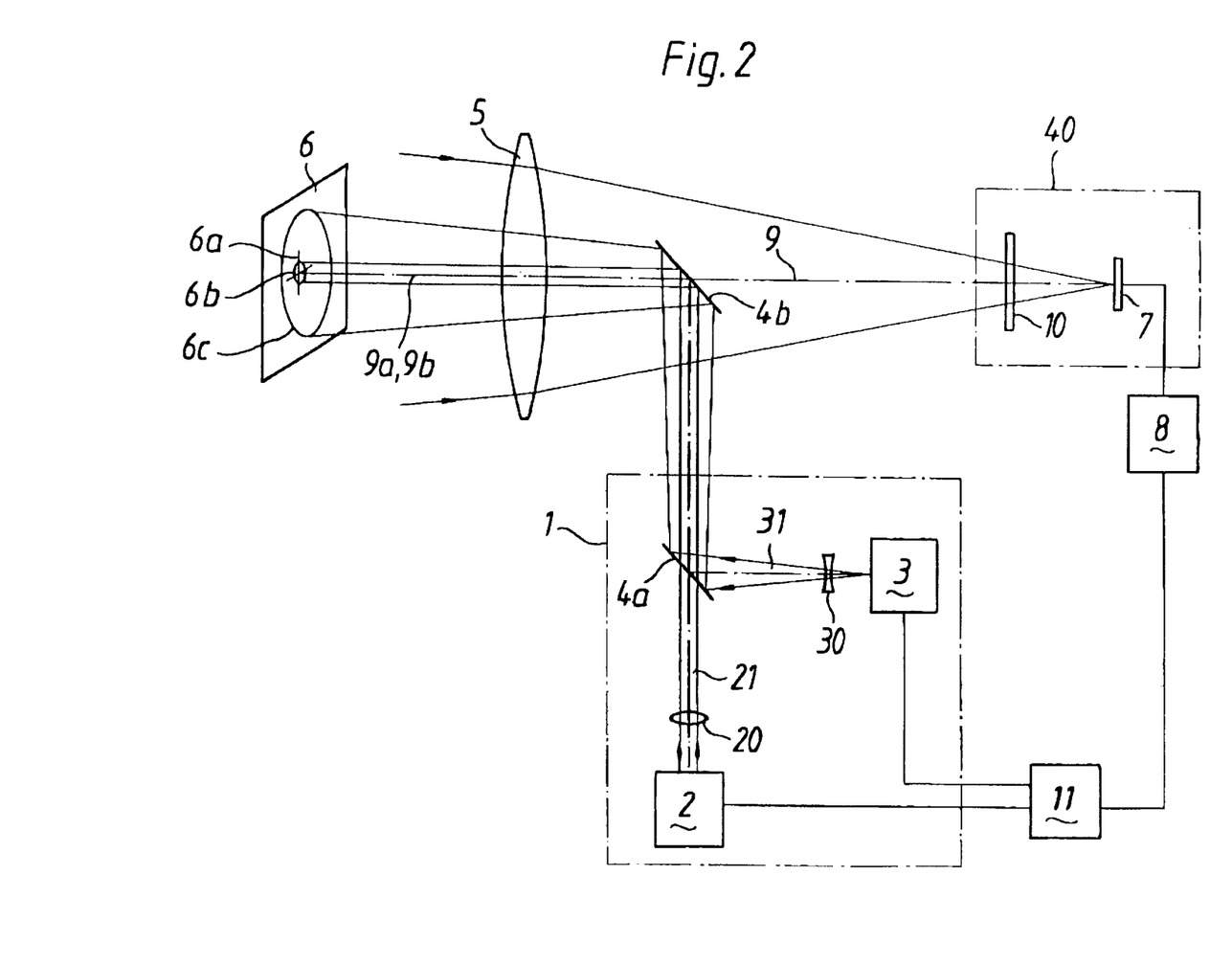
FIG. 2 shows a variant according to FIG. 1, having emission control of the radiation sources.

FIG. 2 schematically shows a selection means 11 having a very different structure. The selection means 11 controls the emission of the radiation sources 2, 3 in such a way that only one or only the other radiation source 2, 3 emits radiation. Thus, only one or only the other radiation beam 21, 31 reaches the detector 7 with which the distance measurement is carried out. To this extent, the two radiation beams 21, 31 may even have the same wavelength in this embodiment. Preferably, however, infrared radiation is used for the divergent radiation beam. In addition, it is of course advantageous to use filter 10 in the received beam path and in the detector unit 40, which filter essentially transmits only the radiation of the two radiation sources 2, 3. Consequently, undesired scattered light of other wavelengths is kept away from the detector 7 and hence the signal/noise ratio is improved. The filter 10 can be installed in a stationary manner in the received beam path if it is appropriately tailored to the wavelength of the radiation emitted by the two radiation sources 2, 3.

Figure 3:
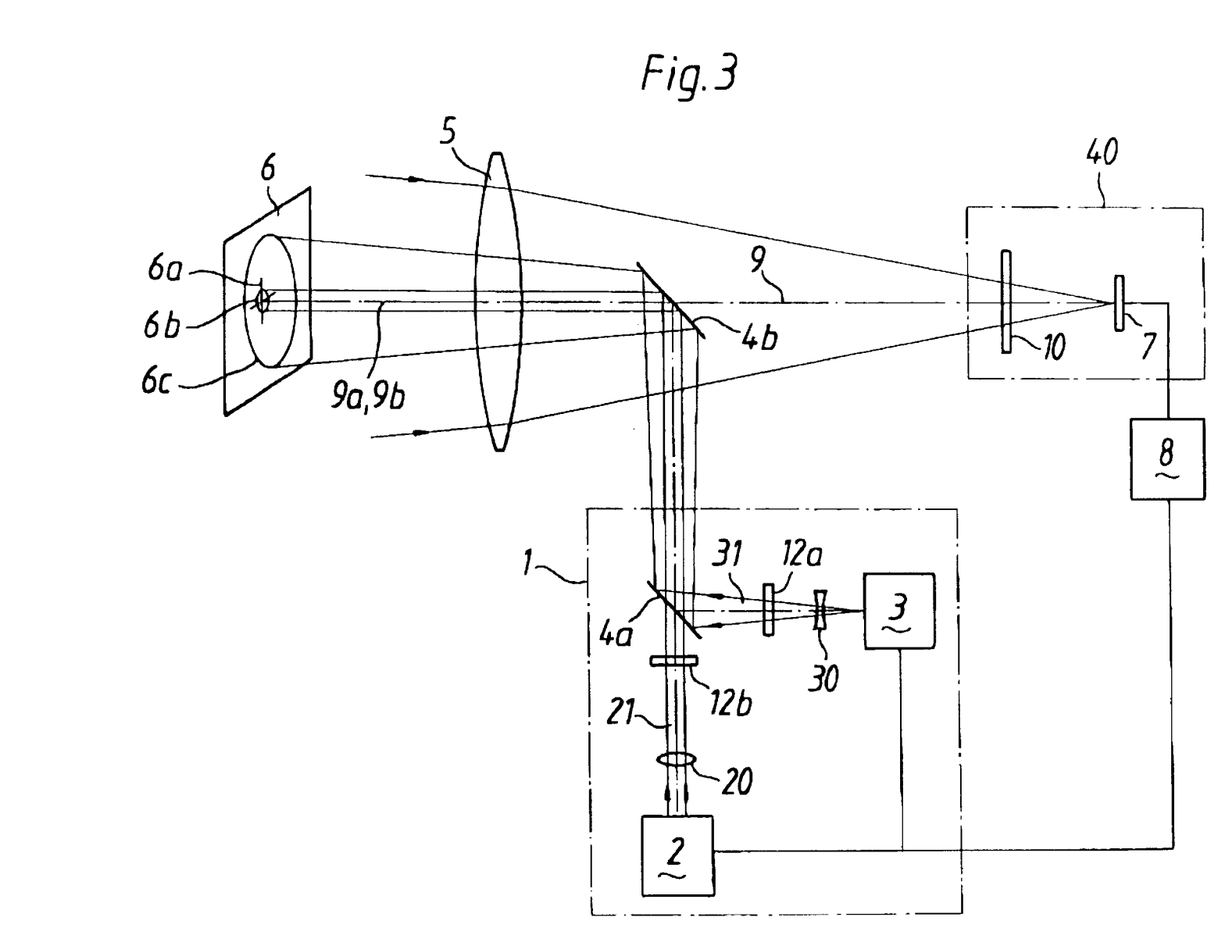
FIG. 3 shows a variant according to FIG. 1, having transmission control.

According to FIG. 3, the selection means 12a, 12b controls the transmission of radiation in the beam paths after the radiation sources 2, 3 in such a way that only one or only the other radiation beam 21, 31 is passed through the lens 5 toward the target object 6. Such a selection means 12a, 12b can, in electrooptical terms, be in the form of a Kerr cell or a liquid crystal cell, which are transparent to light depending on the applied voltage. Manually or electromechanically operated slides, flaps, closable apertures or a rotating wheel having an appropriate orifice and cover serve as alternative mechanical embodiments. In this embodiment, too, the two radiation beams 21, 31 may have the same wavelength.

Figure 4:
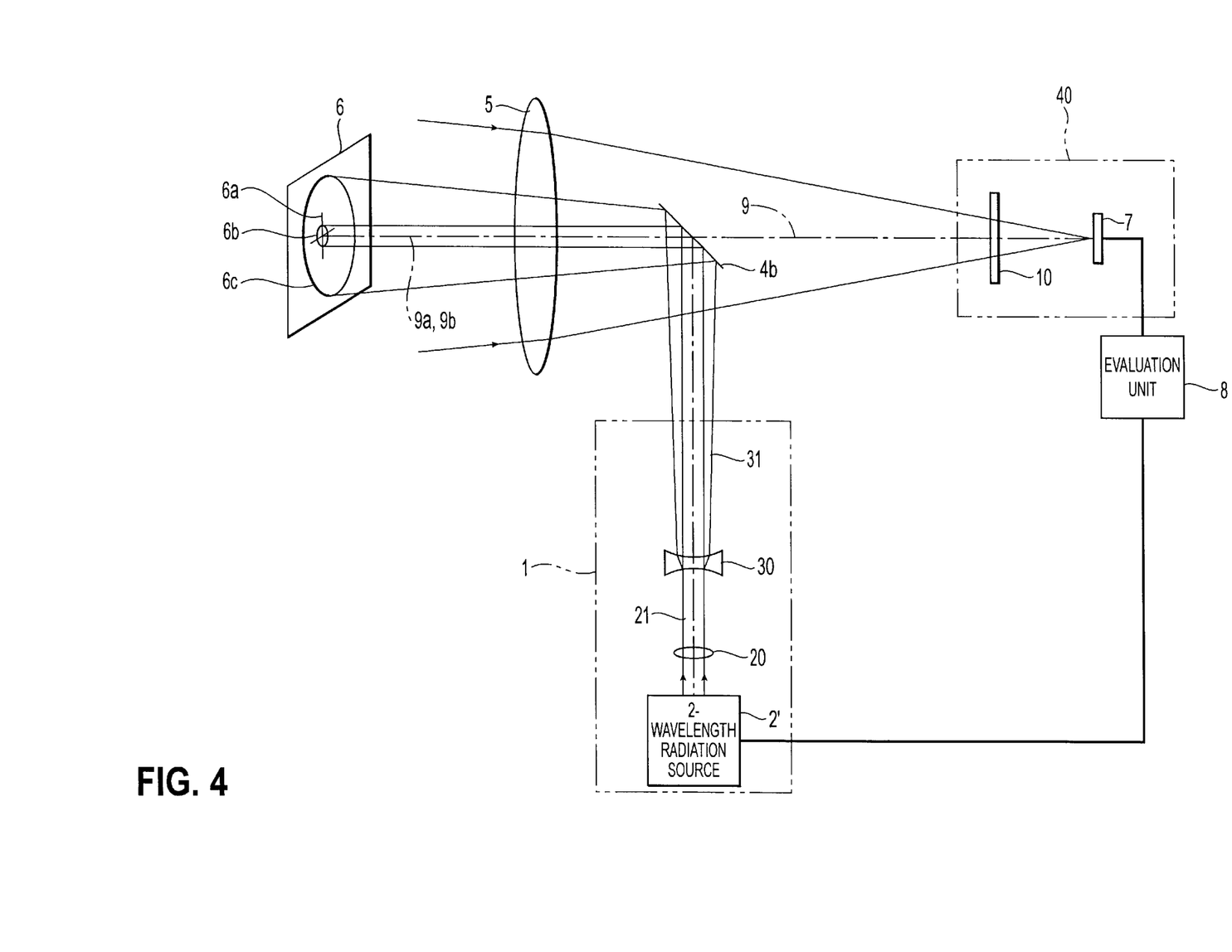
FIG. 4 shows a distance-measuring device having a single radiation source and two different radiation beams

In the embodiment according to FIG. 4, only a single radiation source 2 is used and, in a first development, produces a diffraction-limited radiation beam 21 in the visible wavelength range. By inserting an optical element 30 having beam-diverging properties into the beam path, divergent radiation beam 31 alternatively forms. Thus, by removing the optical element 30 from the beam path or by inserting it into the beam path, the transmitter unit 1 delivers both types of radiation beam 21, 31. The wavelength of the two radiation beams 21, 31 is the same in this case.

The radiation source 2 shown in FIG. 4 can however also be a 2-wavelength laser which emits diffraction-limited light in the infrared wavelength range. The optical element 30 uses a divergent radiation beam 31. By frequency doubling and sufficient radiant intensity, the two-wavelength laser additionally produces a diffraction-limited radiation beam 21 in the visible wavelength range. This radiation beam 21 is directed toward the target object 6 without the beam-diverging optical element 30. In this case, the two radiation beams 21, 31, have different wavelengths.

If the optical element 30 is designed in its optical properties, in particular the wavelength-dependent refractive index, in such a way that it scarcely diverges short-wave light and strongly diverges long-wave light—optionally also in cooperation with the focusing optical element 20—the optical element 30 can be installed in a stationary manner in the beam path. A diffraction-limited visible radiation beam 21 and a divergent infrared radiation beam 31 emerge simultaneously from the transmitter unit 1. In this case, wavelength-dependent optical filters 10, 10a, 10b or wavelength-selective beam dividers 10c must be used as selection means for distinction between the radiation beams 21, 31, as shown in the preceding Figures and in FIGS. 5a, 5b. Thus, the transmitter unit 1 having only one radiation source 2 can also be used in combination with the detector units 40 according to FIGS. 5a, 5b or with integration of the distance-measuring device in a theodolite according to FIGS. 7 and 8. Otherwise, the filters 10, 10a, 10b as a selection means may also be used generally in the beam path of the transmitter unit 1, in addition to or instead of their use in the received beam path in the detector unit 40.

Figure 5A:
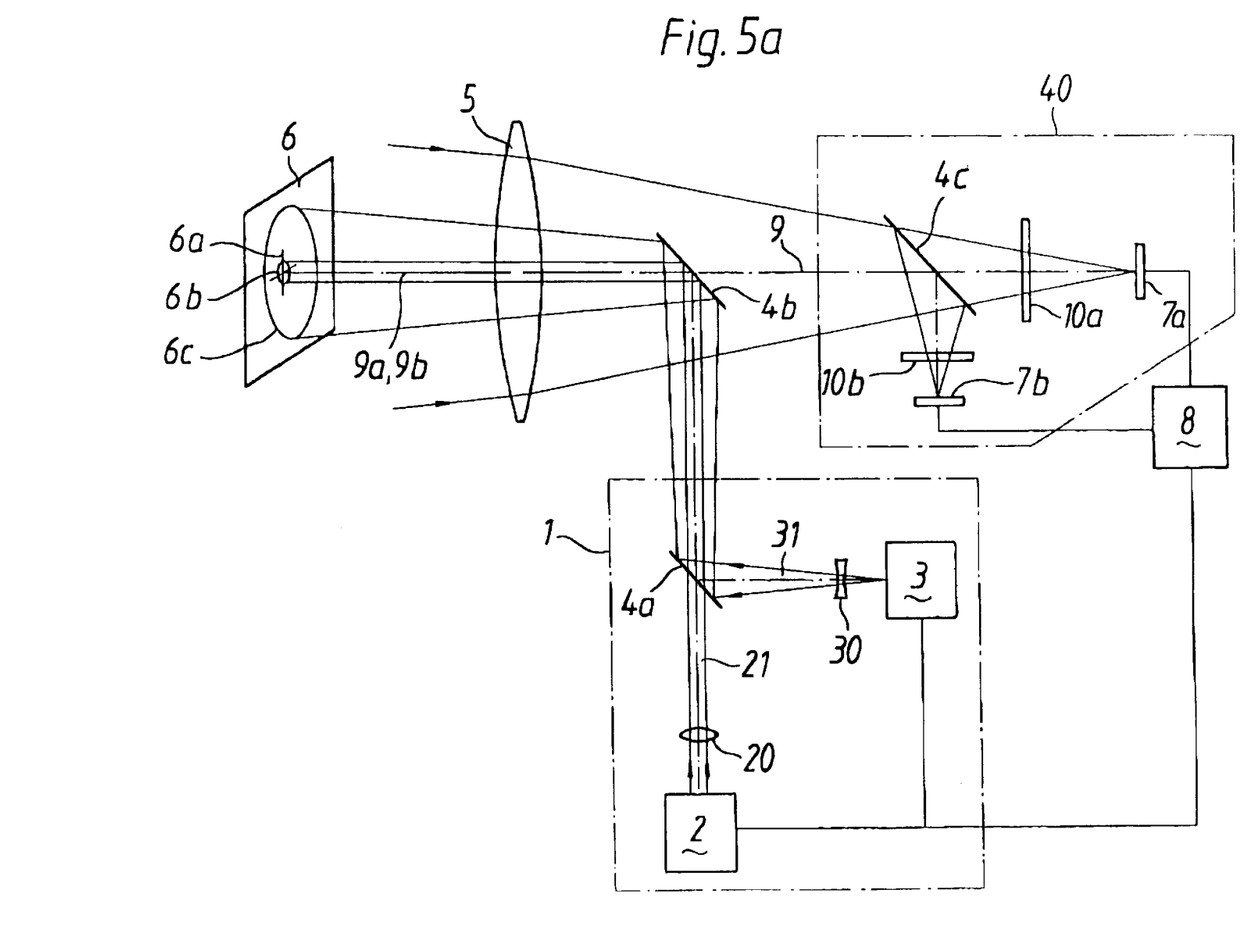
FIG. 5a shows a variant according to FIG. 1, having two detectors.
Figure 5B:
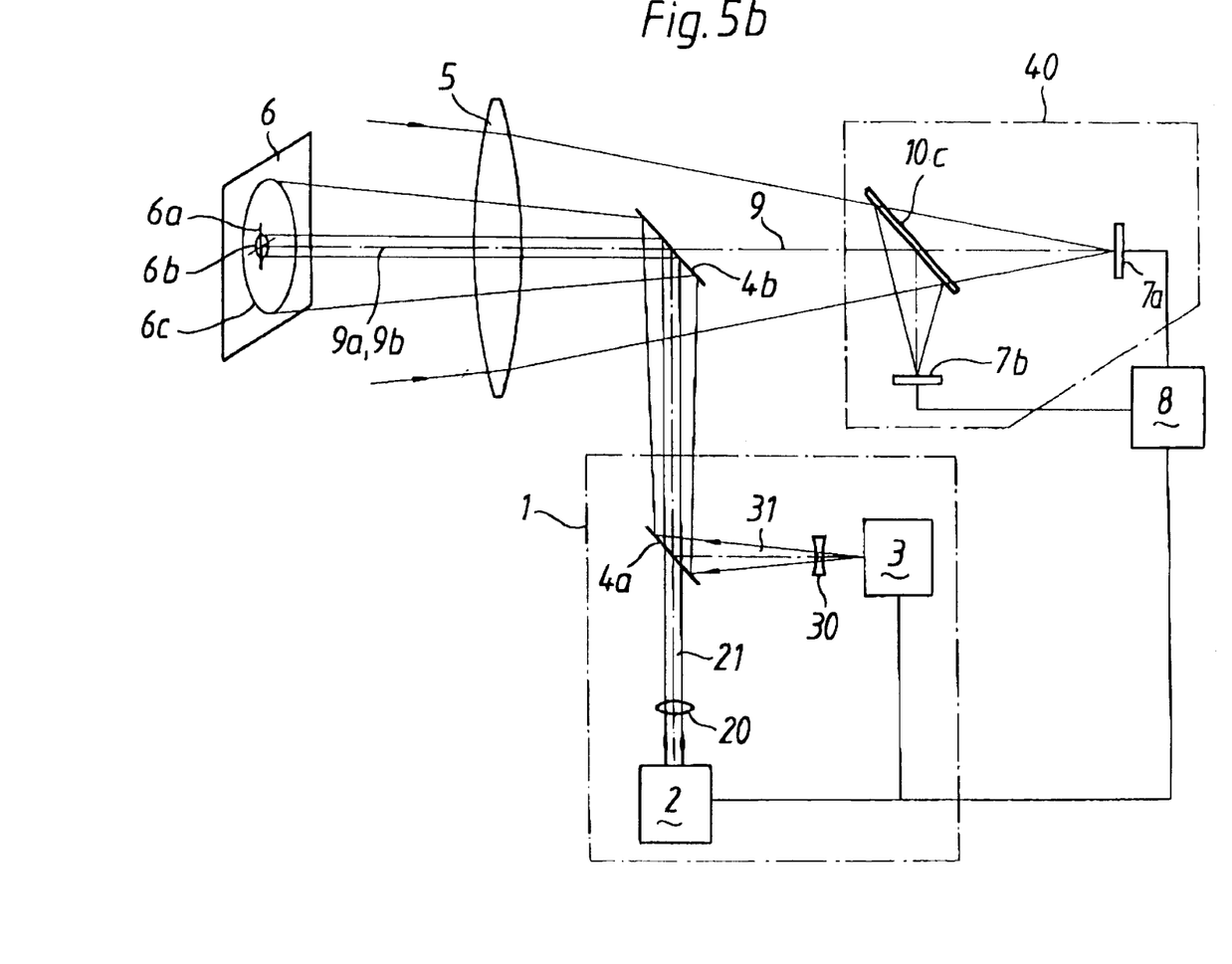
FIG. 5b shows a variant according to FIG. 5a, having a wavelength-selective beam divider.

In contrast to the sequential detection of the radiation beams 21, 31 according to FIGS. 1–3, the radiation beams 21, 31 are simultaneously detected in the embodiments according to FIG. 5a and FIG. 5b. The target object 6 is simultaneously illuminated by the radiation of both radiation sources 2, 3. The radiation received by the lens 5 is divided according to FIG. 5a by a beam divider 4c. In the subsequent beam paths, optical filters 10a, 10b are arranged as selection means. Consequently, one radiation beam 21 reaches one detector 7a and the other radiation beam 31 reaches the other detector 7b. Thus, the two radiation beams 21, 31 can be measured simultaneously and evaluated in the control and evaluation unit 8. Depending on the distance range, the corresponding measured value is selected in the evaluation unit 8, automatically or by presetting or manually, for display and/or for further processing. With the selection means 10a, 10b installed in a stationary manner, no mechanically moving components are required, either in the transmitted beam path or in the received beam path of the distance-measuring device. Switching in the transmitter unit 1 is not necessary in this embodiment.

For the variant shown in FIG. 5b, too, no mechanical or electronic switching devices are required. It contains a wavelength-selective beam divider 10c as selection means. Such beam divider is designed in such a way that it transmits the radiation of one radiation source 2 and reflects the radiation of the other radiation source 3, or vice versa. Here, as in the embodiment according to FIG. 5a, radiation beams 21, 31 having different wavelengths are necessary. The received radiation from the two radiation sources 2, 3 is simultaneously detected and measured by the detectors 7a, 7b.

In the previous embodiments according to FIGS. 1 to 5, the radiation beams 21, 31 directed toward the target objects 6 are, arranged coaxially with the optical axis 9 of the lens 5. It is advantageous if these radiation beams have a substantially smaller cross-sectional area than that of the lens 5 so that as much as possible of the light reflected or scattered by the target object 6 can be picked up by the lens 5 and focused onto the detector 7 or onto the detectors 7a, 7b. The coaxial arrangement of the radiation beams 21, 31 moreover has the advantage that the axes 9a, 9b of the radiation beams 21, 31 and the optical axis 9 of the lens 5 coincide to give a common sighting axis. Thus, the radiation beams 21, 31 are directed exactly toward the target object 6 and can from the outset pass along the "correct" path for the distance determination. The cross-sectional areas of the radiation beams 21, 31 may be rotationally symmetrical or asymmetric with respect to their axes 9a, 9b. In particular, the center of gravity of the cross-sectional area of one visible radiation beam 21 can be made to coincide exactly, and that of the other radiation beam 31 can be made to coincide, with slight deviation, with the optical axis 9 of the lens 5. A slight deviation of the center of gravity of the cross-sectional areas is somewhat more advantageous with respect to the signal/noise ratio for the measurement to retroreflectors.

Figure 6:
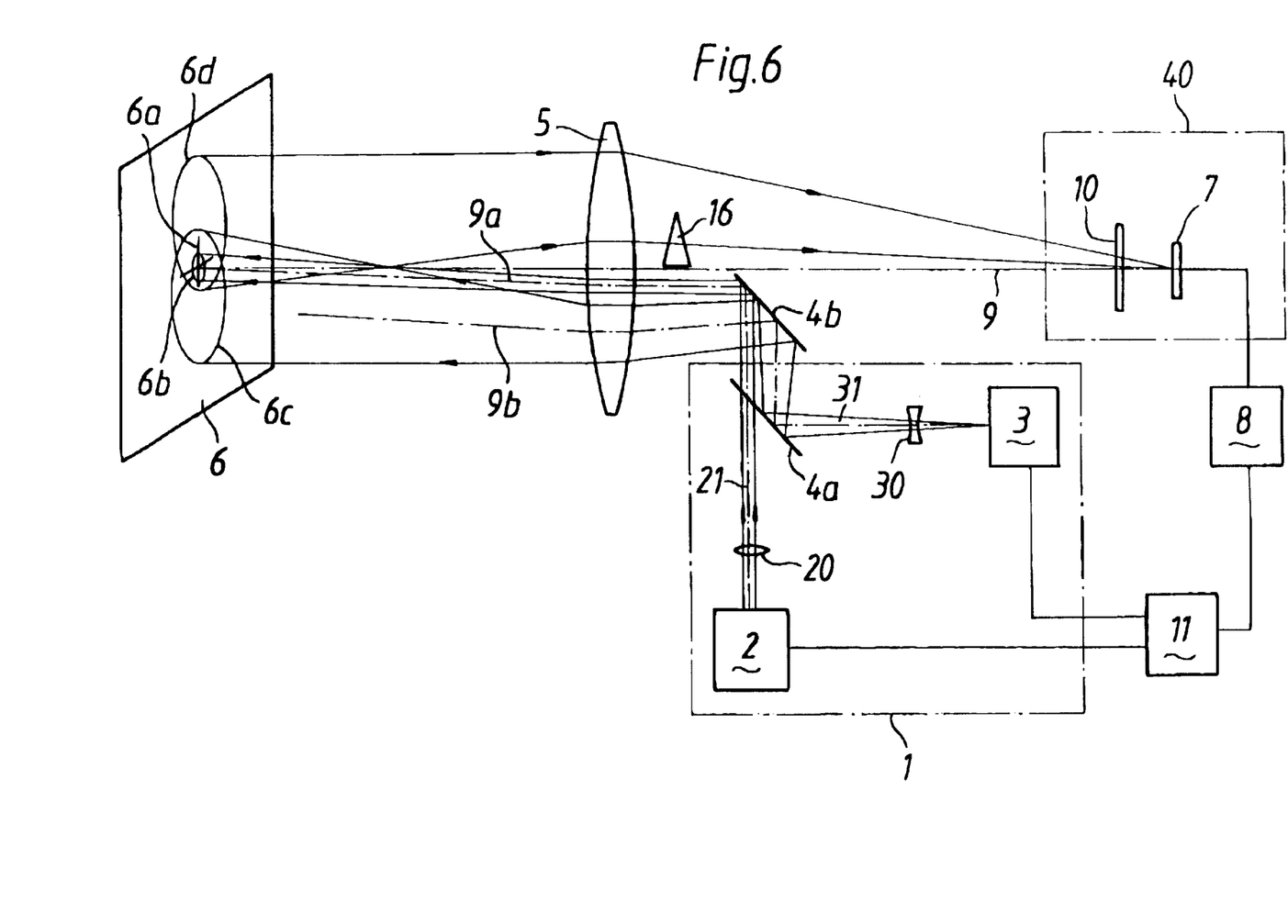
FIG. 6 shows a distance-measuring device having any desired beam path division in the lens.

The axes 9a, 9b of the radiation beams 21, 31 can however also differ from one another or from the optical axis of the lens 5. This is shown schematically in FIG. 6. The radiation emitted by the radiation sources 2, 3 is directed through other aperture areas of the lens 5 toward the target object 6. The received radiation, too, is passed according to FIG. 6 through an aperture area of the lens 5 which is laterally offset with respect to the optical axis 9. The transmitter unit 1 and the detector unit 40 are arranged in such a way that parallel beam axes are permitted. For an improved distance measurement in the near region, an imaging optical element 16 is arranged in the received beam path. It is of course also possible to choose an aperture division of the lens 5 other than that shown in FIG. 6.

A distance-measuring device according to the above embodiment can be combined with an angle-measuring system or integrated together with such a system. The determination of the three-dimensional coordinates of the target object 6 by the polar method (two angle values, one distance value) is thus possible.

However, the distance-measuring device according to the invention can also be installed in a theodolite as an independent measuring instrument. The angle measurement with the theodolite relates to the optical axis of the theodolite telescope, while the distance measurement is effected along the optical axis 9 of the lens 5 of the distance-measuring device. Owing to the separate optical axes, certain errors arise in the determination of the coordinates.

Figure 7:
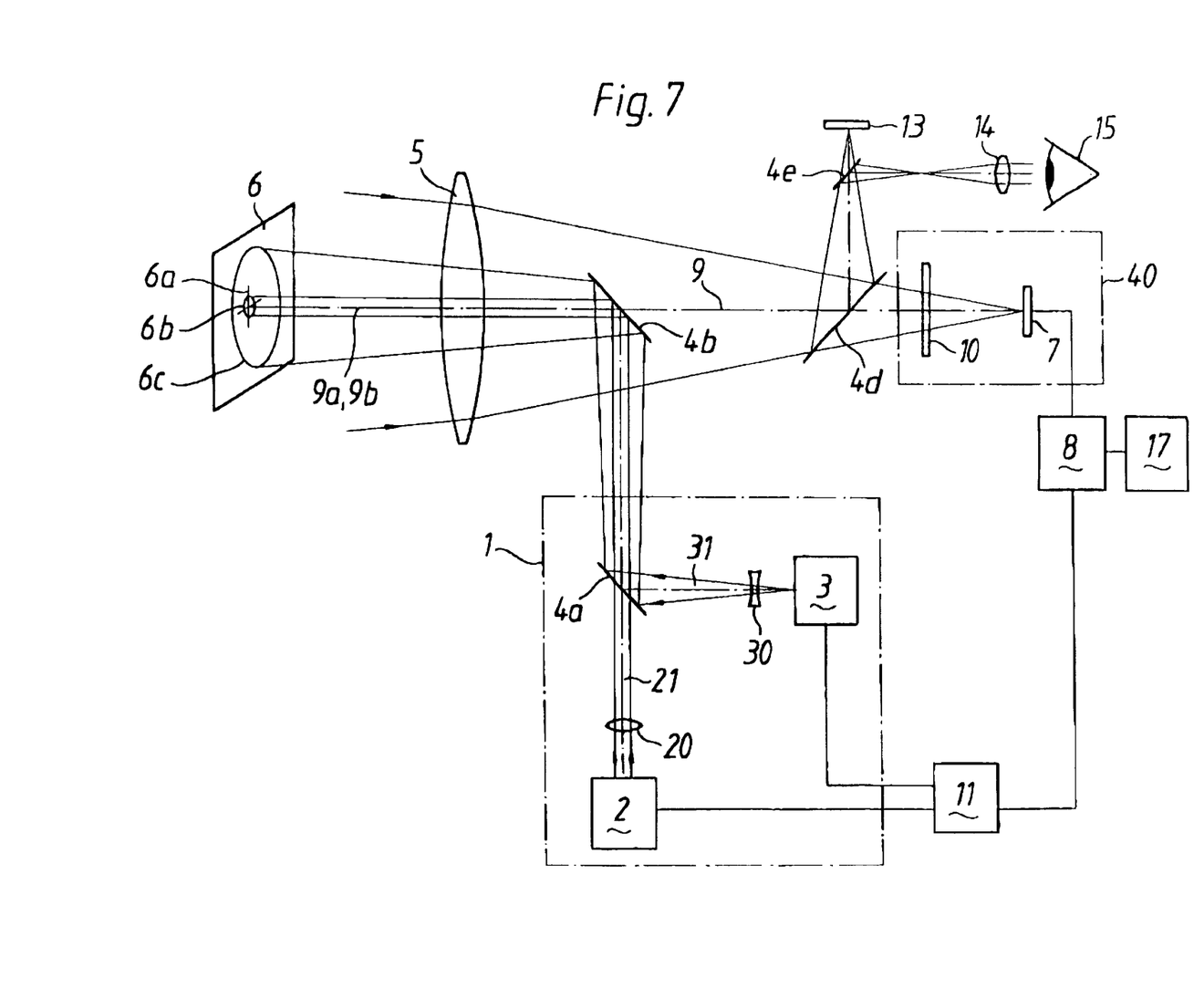
FIG. 7 shows a distance-measuring device, according to the invention, integrated in the beam path of a theodolite telescope

It is therefore advantageous if the optical axis of the theodolite coincides with that of the distance-measuring device and all measuring parameters relate only to a common axis. FIG. 7 schematically shows such an integration of distance-measuring device and theodolite. The lens 5 is common to both the distance-measuring device and the telescope of the theodolite. A part of the received light is removed by means of a beam divider 4d in the received beam path and is fed via an eyepiece 14 to the viewer's eye 15. The viewer can thus sight the target object 6 with the theodolite telescope. The angle and distance measurement based on the same optical axis 9 determines the three-dimensional coordinates of the target object 6 with very high accuracy. In addition, via a further beam divider 4e, images of the target object 6 and its environment can be recorded by a camera 13.

Figure 8:
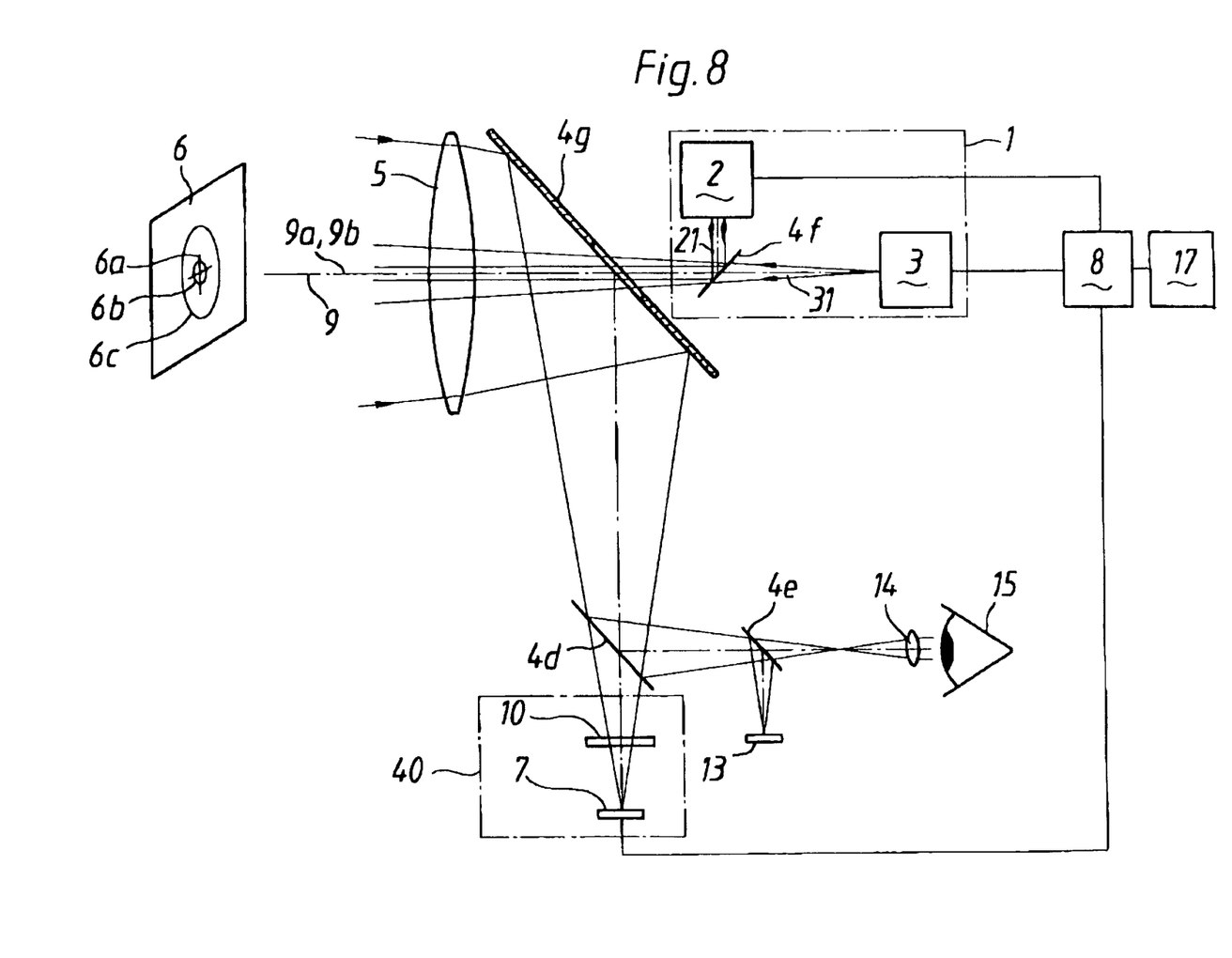
FIG. 8 shows a variant according to FIG. 7, having different beam paths.

FIG. 8 shows a variant of the distance-measuring device according to the invention which is integrated in a theodolite, said distance-measuring device having beam paths other than those in FIG. 7. A beam divider 4f in the transmitter unit 1 reflects the visible light of one radiation source 2 while it transmits the radiation of the other radiation source 3. The radiation of the radiation sources 2, 3 then passes through an opening in a mirror 4g to the lens 5 and to the target object 6. The radiation reflected or scattered there and then received by the lens 5 is reflected by means of the mirror 4g to the detector 7 and the telescope eyepiece 14. The mirror 4g shown in FIG. 8 is in the form of a flat mirror. In modified form, it may also have a curved mirror surface for focusing the received radiation. In this case, the refractive power of the lens 5 can be chosen correspondingly lower or the lens 5 can even be replaced by the mirror curved in this manner. In this embodiment, the eyepiece 14 can of course also be replaced by a camera 13 or the latter can additionally be added according to FIG. 8.

What is claimed is:

1. A device for optoelectronic measurement of distances between the device and non-cooperative target objects, which have a surface scattering a radiation beam, and cooperative target objects, which have a target mark reflecting a radiation beam in a directed manner, in geodetic and industrial surveying, comprising:

a) a transmitter unit for alternative emission of a first radiation beam lying in the visible wavelength range and a second radiation beam lying in the wavelength range extending from visible to infrared, for the measurement of distances to the target objects;

b) optical input elements for aligning the radiation beams generated by the transmitter unit with the target objects;

c) a single transmitting and receiving lens having two functions,
      a first function for transmitting the first radiation beam aligned by the optical input elements, with a small, diffraction-limited beam divergence with respect to the non-cooperative target object, and for transmitting the second radiation beam aligned by the optical input elements, with a large beam divergence with respect to the cooperative target object, and
      a second function for receiving the radiation beams reflected or scattered by the target objects and for focusing said beams onto a detector unit comprising at least one optoelectronic detector for detecting said beams and producing detector signals;

d) first selection means coordinated with the transmitter unit and intended for controlling the alternative emission of the first and of the second radiation beam; and e) a control and evaluation unit for controlling the first selection means and for determining the distance by evaluation of the detector signals.

2. The device as claimed in claim 1, wherein the transmitter unit has a first radiation source, the first radiation source being a laser.

3. The device as claimed in claim 2, wherein the first radiation source is a two-wavelength laser.

4. The device as claimed in claim 2, wherein the transmitter unit has a second radiation source, the second radiation source being a laser emitting in an infrared wavelength range.

5. The device as claimed in claim 2, wherein the transmitter unit has second radiation source, the second radiation source being a light emitting diode emitting in an infrared wavelength.

6. The device as claimed in claim 1, wherein the first radiation beam aligned by the optical input elements and the radiation beams received by the transmitting and receiving lens and reflected or scattered by the target objects are oriented coaxially with one another.

7. The device as claimed in claim 6, wherein the first radiation beam aligned by the optical input elements and the second radiation beam aligned by the optical input elements are oriented coaxially with one another.

8. The device as claimed in claim 1, wherein the cross-sectional area of the first and of the second radiation beam passing through the transmitting and receiving lens is substantially smaller than the cross-sectional area of the transmitting and receiving lens.

9. The device as claimed in claim 1, an angle-measuring system for determining the two dihedral angles being provided, wherein the first radiation beam aligned by the optical input elements and the axis of sight of the angle-measuring system are oriented coaxially with one another.

10. The device as claimed in claim 1, wherein the transmitting and receiving lens together with an eyepiece forms a telescope.

11. The device as claimed in claim 1, which has a beam divider (d) by means of which a part of the radiation received from the transmitting and receiving lens is deflected to an electronic camera.

12. The device as claimed in claim 1, wherein second selection means are coordinated with the detector unit.

13. The device as claimed in claim 1, wherein first selection means are coordinated with the transmitter unit.

14. The device as claimed in claim 1, wherein an electronic switching device for controlling the radiation sources is provided as first selection means.

15. The device as claimed in claim 1, wherein electro-optical switching devices for controlling the transmission of the first and of the second radiation beam are provided as first selection means.

16. The device as claimed in claim 1, wherein mechanical switching devices for controlling the transmission of the first and of the second radiation beam are provided as first selection means.

17. The device as claimed in claim 1, an angle-measuring system for determining the two dihedral angles being provided, wherein the first radiation beam aligned by the optical input elements and the axis of sight of the angle-measuring system are oriented coaxially with one another.

18. The device as claimed in claim 13, wherein an electronic switching device for controlling the radiation sources is provided as first selection means.

19. The device as claimed in claim 13, wherein electro-optical switching devices for controlling the transmission of the first and of the second radiation beam are provided as first selection means.

20. The device as claimed in claim 13, wherein mechanical switching devices for controlling the transmission of the first and of the second radiation beam are provided as first selection means.

21. The device as claimed in claim 12, wherein a plurality of optical filters is provided as second selection means between the transmitting and receiving lens and the at least one detector.

22. The device as claimed in claim 12, wherein wavelength-selective beam dividers are provided as second selection means between the transmitting and receiving lens and the at least one detector.

23. A device for optoelectronic measurement of distances between the device and non-cooperative target objects, which have a surface scattering a radiation beam, and cooperative target objects, which have a target mark reflecting a radiation beam in a directed manner, in geodetic and industrial surveying, comprising:

a) a transmitter unit for simultaneous emission of a first radiation beam lying in the visible wavelength range and a second radiation beam lying in the wavelength range extending from visible to infrared, for the measurement of distances to the target objects, the first and the second radiation beam having different wavelength ranges;

b) optical input elements for aligning the radiation beams generated by the transmitter unit with the target objects;

c) a single transmitting and receiving lens having two functions,
a first function for transmitting the first radiation beam aligned by the optical input elements, with a small, diffraction-limited beam divergence with respect to the non-cooperative target object, and for transmitting the second radiation beam aligned by the optical input elements, with a large beam divergence with respect to the cooperative target object, and
a second function for receiving the radiation beams reflected or scattered by the target objects and for focusing said beams onto a detector unit comprising at least one optoelectronic detector for detecting said beams and producing detector signals;

d) wavelength-selective, second selection means coordinated with the detector unit and intended for separating the simultaneously emitted radiation beams, reflected or scattered by the target objects, for separate detection of said beams; and e) a control and evaluation unit for controlling the simultaneous emission of the first and of the second radiation beam by the transmitter unit and for determining the distance by evaluation of the detector signals.

24. The device as claimed in claim 23, wherein a plurality of optical filters is provided as second selection means between the transmitting and receiving lens and the at least one detector.

25. The device as claimed in claim 23, wherein wavelength-selective beam dividers are provided as second selection means between the transmitting and receiving lens and the at least one detector.

26. The device as claimed in claim 23, wherein the first radiation beam aligned by the optical input elements and the second radiation beam, received by the optical input elements and the radiation beams received by the transmitting and receiving lens and reflected or scattered by the target objects are oriented coaxially with one another.

27. The device as claimed in claim 23, wherein the cross-sectional area of the first and of the second radiation beam passing through the transmitting and receiving lens is substantially smaller than the cross-sectional area of the transmitting and receiving lens.

28. The device as claimed in claim 23, wherein the transmitting and receiving lens together with an eyepiece forms a telescope.

29. The device as claimed in claim 23, which has a beam divider (d) by means of which a part of the radiation received from the transmitting and receiving lens is deflected to an electronic camera.

* * * * *